April 23, 1929.  R. A. GOELLER  1,710,416

CONNECTER

Filed April 16, 1927

Inventor
Robert A. Goeller
By his Attorneys
Edward, Sager & Power

Patented Apr. 23, 1929.

1,710,416

UNITED STATES PATENT OFFICE

ROBERT A. GOELLER, OF LARCHMONT, NEW YORK.

CONNECTER.

Application filed April 16, 1927. Serial No. 184,227.

This invention relates to connecters for members of generally cylindrical form and particularly to a detachable connecter for electrical conductors and the like.

The object of this invention is to provide a connecter which will be rugged in construction and simple in use, adapted to securely grip and hold the conductor.

A further object of the invention is to provide a connecter which will give a tight biting mechanical grip on the conductor and at the same time provide an extended close electrical contact of minimum resistance.

Figure 1:
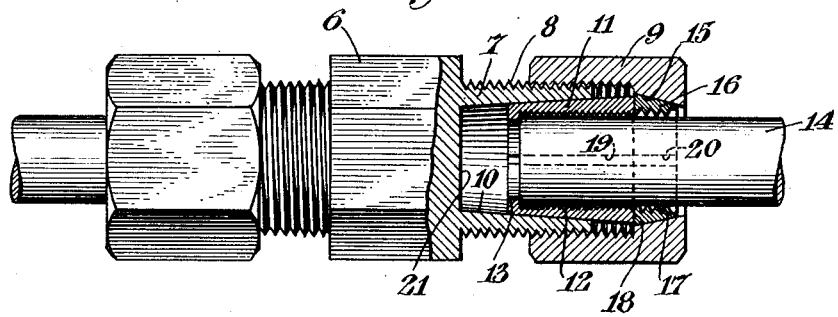

Further objects of the invention, particularly in the form and construction of the parts will appear from the following specification taken in connection with the accompanying drawings, in which Figure 1 is a side view partly broken away of a connecter embodying my invention.

Figure 2:
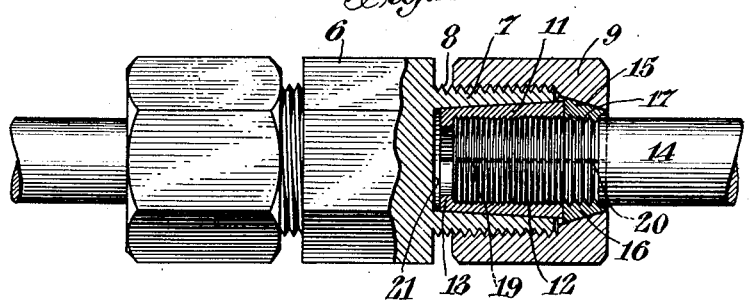
Figure 3:
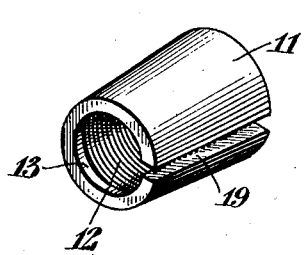
Figure 4:
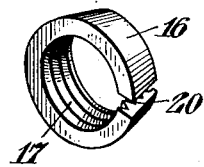

Figure 2 is a similar view showing the connecter tightened onto the conductor, and Figures 3 and 4 are perspective views of details shown in Figures 1 and 2.

In the embodiment of the invention shown in the drawings, the main body member 6 of the connecter has a tubular portion 7 threaded on the outside as indicated at 8 to receive an internally threaded sleeve member 9. The tubular member 7 has an internal conically tapered surface 10 within which is fitted a similarly tapered gripping bushing 11 having relatively shallow circular serrations 12 and an inwardly extending end flange 13 to limit the inward travel of the conductor 14.

The sleeve member 9 also has an interior conically tapered surface 15 within which is fitted a gripping ring 16 tapered to correspond with and co-operate with the taper 15. The ring 16 has interior annular serrations or teeth 17, these serrations 17 being relatively deep in comparison with the serrations 12, and the bushing 11 and ring 16 abut together at their meeting ends at 18.

With the parts in position as shown in Figure 1 the end of the conductor is inserted in through the ring 16 and into the bushing 11, the sleeve member 9 being screwed outwardly on threads 8 so as to leave the bushing and ring in expanded condition, these members being split as indicated at 19 and 20 so as to permit them to be compressed and contracted within their elastic limits and have them re-expand to their original form when the pressure is released. The flange 13 of the bushing 11 prevents the conductor from extending inward too far and so prevents it from coming into engagement with the bottom 21 of the tubular member 7. With the parts in this position the sleeve member 9 is turned to screw it inward on the tubular member 7 and the tapered surface 15 engages the ring 16 and presses it against the end of the bushing 11 which in turn engages against the tapered surface 10 so that as the sleeve 9 moves to the left (Fig. 1) on the tubular member 7 the two tapers 10 and 15 will approach each other squeezing and contracting the bushing 11 and ring 16 between them. As the bushing and the ring contract they will grip the conductor 14 and move it relatively inward with them, the ring 16 tending to rotate with the sleeve 9 and cause the serrations 17 to cut deeper and deeper into the conductor.

The gripping of the conductor by the bushing 11 and the contact of the bushing with the taper 10 will hold the conductor secure against rotation with the sleeve 9, the body portion being held by a wrench in the case of the double connecter shown. Preferably the parts will be formed so that the bushing 11 will grip the conductor as soon as or before the ring 16 begins to grip it.

The taper 10 is at a smaller angle to the axis than the taper 15 so that the bushing 11 will contact with the conductor before there is any considerable contraction of the ring 16, the inward pressure component of the taper 10 being greater than the corresponding inward pressure of the taper 15 for the same axial thrust. After the bushing 11 has been contracted sufficiently to engage the conductor further movement of the sleeve 9 will cause the ring 16 to contract and its serrations 17 to penetrate and grip the conductor.

In the application of the connecter the screwing inward of the sleeve 9 will force the bushing and ring together and as the bushing engages and grips the conductor it will offer more and more resistance to contraction and more and more back pressure against the ring 16 which will consequently be contracted by the taper 15 riding over it and causing it to bite deeply into the material of the conductor. The ring 16 is relatively small axially and the contracting pressure is concentrated on a small number of sharp serrations while the gripping pressure of the bushing 11 is distributed over a much larger area and larger number of serrations. Consequently, for the same axial thrust, the ring 16 will contract more than the bushing 11 and its serrations 17 will cut deeper into the member being gripped. These two gripping members thus co-operate together to seize upon the conductor, and while slightly moving it inward to the tube 7, effect a very strong and permanent gripping action. In order to withdraw the conductor its entire end portion would have to be stripped through the serrations 12 and 17. Since there has been substantially no tendency to twist the conductor as a whole due to the holding of the conductor by the bushing 11 during fastening, there is no tendency for it to untwist and any turning of the conductor on the axis would not release it from the circular serrations which grip it. Any strains tending to withdraw the conductor bind the gripping ring 16 more and more deeply as said ring is pulled outward against the outwardly contracting taper 15.

The bushing 11 is preferably of relatively soft metal of high electrical conductivity while the ring 16 is of relatively hard metal such as steel. The major part of the gripping and holding action is accomplished by the ring 16 and at the same time the bushing 11 provides an extended close electrical contact of very low resistance. By mounting the bushing and ring in opposing relation their relative gripping actions are automatically proportioned in each individual instance by the substantially equal axial thrusts between these members. The relative position of the parts in final gripping relation will vary according to the size and material of individual conductors but the proper electrical contact and mechanical grip are assured in every case.

The bushing 11 and ring 16 will preferably have their slots 19, 20 of such width that they will not close completely in the fully gripped position of the parts. In this position the end of the bushing will also be spaced from the bottom 21 of the tubular member 7. While my invention has been described in connection with a specific embodiment, it is not intended to be limited thereto. The gripping means above described may be used with a double connecter as shown and with a lug in which the gripping means at one end is replaced by attaching means of any desired form or this gripping means may be otherwise applied.

I claim:—

1. A gripping device for a conductor comprising a tubular portion having an internal taper, a sleeve member movable with relation to said tubular portion and having an internal taper in the opposite direction to the taper of the tubular portion, and a plurality of separate internal bushing and ring members compressed into contact with portions of a continuous length of said conductor by the relative movement of said tapers of said tubular portion and sleeve member.

2. A gripping device for a conductor comprising a tubular portion having an internal taper, a sleeve member movable with relation to said tubular portion and having an internal taper in the opposite direction to the taper of the tubular portion, an internal bushing member adapted to be compressed by the taper of said tubular portion and comprising end stop means adapted to limit the insertion of a conductor, and an internal ring member adapted to be compressed into contact with the conductor by the taper of said sleeve member, said bushing member and ring member abutting against each other at an intermediate point.

3. A gripping device for a conductor comprising a tubular portion having an internal taper, a sleeve member movable with relation to said tubular portion and having an internal taper, a relatively long bushing member adapted to be compressed by the taper of said tubular portion and a relatively short internal ring member adapted to be compressed by the taper of said sleeve member into contact with portions of a continuous length of said conductor, said bushing and ring member having their ends abutting against each other at an intermediate point of said length.

4. A gripping device for a conductor comprising a member having a socket, a compressible bushing within said socket, said bushing having internal serrations engageable with the surface of a conductor, a compressible ring having internal annular serrations adapted to penetrate and grip the conductor, and single means for compressing said ring and bushing on the conductor comprising a member axially movable with relation to said socket to force said bushing and ring member into gripping contact with portions of a continuous length of said conductor.

5. A gripping device for a conductor comprising a member having a socket, a compressible bushing within said socket, said bushing being formed of metal of relatively high electrical conductivity and having internal serrations engageable with the surface of a conductor, a compressible ring of relatively hard metal having internal annular serrations adapted to penetrate and grip the conductor, and single means for compressing said ring and bushing on the conductor.

6. A gripping device for a conductor comprising a member having a socket, a compressible bushing within said socket, said bushing being formed of metal of relatively high electrical conductivity and having internal serrations engageable with the surface of a conductor, a compressible ring of relatively hard metal having internal annular serrations adapted to penetrate and grip the conductor, and single means carried by said member for compressing said ring and bushing on the conductor.

7. A gripping device for a conductor comprising a member having a socket, a compressible bushing within said socket, said bushing being formed of metal of relatively high electrical conductivity and having internal serrations engageable with the surface of a conductor, a compressible ring of relatively hard metal having internal annular serrations adapted to penetrate and grip the conductor, and single means threaded on said member for compressing said ring and bushing on the conductor.

8. A gripping device for the end of a conductor comprising a main body member having a tubular portion with an internal taper, an internal bushing member adapted to be compressed by the taper of said tubular portion and comprising an internal opening for the end of the conductor and end stop means at the inner portion of said bushing adapted to engage the end of the conductor and limit its insertion and prevent it from passing through said bushing, and means comprising a member axially movable with relation to said tubular portion for forcing said bushing axially to grip said conductor and move it axially inward in said tubular portion.

ROBERT A. GOELLER.